Patented May 7, 1946

2,399,770

UNITED STATES PATENT OFFICE 2,399,770

SEALING OF GLASS TO METAL

Raymond L. Taylor, New Providence, N. J., assignor to Bell Telephone Laboratories, Incorporated, New York, N. Y., a corporation of New York No Drawing. Application July 28, 1943, Serial No. 496,523

11 Claims. (Cl. 49—81)

This invention relates to a process for forming a seal between metal and glass, and more particularly to such a process employing a flux which makes possible the ready formation of a seal between glass and a metal which otherwise resists the formation of a seal between the metal and glass.

While methods have been known for forming seals between glass and various types of metals, it has heretofore been found difficult, if not impossible, to form satisfactory seals between glass and tantalum metal or zirconium metal. Yet it is highly desirable that it be possible to form between glass and such metals strong seals which are gas-proof and/or liquid-proof for various types of apparatus such as electron discharge devices, electrolytic condensers, etc.

It has been established that to form a satisfactory strong seal between a metal and glass, the metal must have on its surface a thin adherent film of an oxide which can be made to dissolve in the glass at elevated temperatures and which acts as a cement between the glass and the metal. The oxide film should not be so thin that all of the oxide is absorbed by the glass since in such a case the adherence of the glass to the metal will be weak; furthermore, the oxide film should not be too thick, since a thick film will cause a weak joint between the metal and the glass and will also permit leakage of liquids or gases along the interface between the oxide and the metal.

Tantalum metal and zirconium metal each has an oxide film on its surface which is developed upon exposure of the metal to the atmosphere and which serves to passivate the surface of the metal or render it resistant to corrosion. In the development of the present invention, however, it was found that certain common properties of these metals and of their oxide films rendered it extremely difficult under ordinary conditions to form a satisfactory seal between such a metal and glass. It appears that the oxide film on each of these metals is of such a nature that a high temperature is required to cause the oxide of the film to dissolve in glass. But at such elevated temperatures each of these metals chemically combines with substantial quantities of oxygen from the air. Therefore, as the metal is heated in the presence of oxygen to a temperature sufficient to cause the oxide of the film to dissolve in glass a temperature is reached at which oxidation begins suddenly, and unless the temperature is sharply reduced, will vigorously continue of its own accord, the reaction being strongly exothermic. Consequently, before a temperature is reached which is high enough to cause the oxide to dissolve in the glass to form a seal between the metal and glass, the thickness of the oxide film becomes excessive and uncontrollable. This excessively thick oxide film, as was indicated above, causes poor adherence between the glass and the metal and permits leakage of gases or liquids through the seal.

Moreover, it is characteristic of each of these metals, and particularly of zirconium, that its oxide diffuses into the metal as the metal is heated; such diffusion of the oxide embrittles and otherwise adversely affects the metal.

The above difficulties are largely, if not entirely, overcome and a seal which is strong, proof against leakage of gases or liquids, and otherwise satisfactory, may be readily formed between tantalum or zirconium metal and glass by the process of the invention, according to which a flux is employed which comprises at least one fluoride of an alkali metal or alkaline earth metal, e. g., lithium, sodium, potassium, rubidium, cesium, beryllium, magnesium, calcium, strontium and barium. According to the present invention, glass of suitable characteristics in the molten state is applied to the surface of the tantalum or zirconium metal in the presence of such a flux, and is then solidified.

The flux apparently operates to promote the solution of the oxide of the metal in the glass and thus permits the formation of a seal at a temperature lower than that which would otherwise be operative. Since a lower temperature is employed, excessive oxidation of the metal due to the gettering action of the metal, and embrittlement of the metal due to diffusion of the oxide during heating of the metal are minimized if not wholly avoided. Furthermore, the presence of the flux on the surface of the metal is surprisingly effective in inhibiting oxidation of the surface when the metal is heated; this also prevents excessive oxidation and deleterious embrittlement of the metal. The flux also acts to promote wetting of the metal by the glass, apparently because the alkali metal fluorides and alkaline earth metal fluorides attack both the glass and the metal; such wetting makes possible good contact between the glass and metal and retards deleterious oxidation of the metal. These fluorides are also readily absorbed by the glass and hence do not harm the seal between the glass and metal. For the above reasons the flux makes possible the production without difficulty of seals between glass and zirconium and tantalum metals which are strong and leak-proof.

The glass employed should, of course, have a temperature coefficient of expansion and other characteristics which are suitable to permit the formation of a strong seal between the glass and metal. The temperature coefficient of expansion of the glass should be approximately the same as that of the metal to which the glass is to adhere; this is necessary to prevent the development in the glass of stresses which would cause the glass to fracture upon temperature changes as occur upon cooling or in operation of the apparatus containing the glass-to-metal seal. Examples of glasses, and their compositions by weight, which have been successfully employed in the formation of seals between tantalum metal and glass and between zirconium metal and glass are

| Name of glass | $SiO_2$ | $Na_2O$-$K_2O$ | $B_2O_3$ | PbO | $Al_2O_3$ | Miscellaneous oxides |
|---|---|---|---|---|---|---|
| Corning thermometer glass 752 | 72 | 10 | 10 | | 5 | 3 |
| Corning "Nonex" 772 | 73 | 4.5 | 16.5 | 6 | | |
| Corning "Pyrex" 774 | 80.5 | 4.2 | 12.9 | | 2.2 | 0.2 |

Other glasses having suitable expansion and other characteristics may, of course, be employed.

The metal which may be sealed according to the present invention may be tantalum or zirconium metal as such, or an alloy containing a predominant proportion of either of said metals and having the characteristics of said metal and which is, therefore, difficult to seal to glass. While metal articles of various shapes and sizes may be sealed to glass according to the present invention, the invention is particularly applicable to the sealing of wires of metal since these are most used. It is advantageous that the surface of the metal which is to be sealed to the glass be clean. This may be accomplished by washing the metal in suitable solvents, chemical cleaners, or the like.

The flux may consist of any one or more of the above-indicated fluorides; however, sodium fluoride appears to be the most advantageous because of its ready availability, its substantial solubility which permits easy application, and the ease with which it may be employed.

The flux may be employed in various manners; the primary desideratum is to have the flux in contact with the surface of the metal to be sealed to the glass while the molten glass is being applied thereto.

The flux, for example, may be applied by dipping or otherwise applying to the surface of the metal to be sealed to the glass a solution containing the flux if it is one which is substantially soluble such as sodium fluoride; advantageously the solution is a saturated solution, although lesser concentrations may be employed. Alternatively, a suspension of the finely divided flux in a suitable evaporable liquid may be applied to the metal. If a solution or suspension is employed, it is advantageous to evaporate the liquid to deposit the flux on the metal before sealing the metal to the glass. As another example, the wire or other article of the metal may be contacted with the fluoride salt in solid form; thus, the wire, preferably while heated, may be inserted into a mass of finely divided salt so that some of the salt adheres to the surface of the wire.

In the sealing operation the metal article such as wire which is to be sealed to the glass and which has on its surface the fluoride flux is contacted with the molten glass. For best results, the temperature of the glass should be as low as is possible to obtain without loss of wetting characteristics; this prevents excessive oxidation of the surface of the metal which causes the above-indicated disadvantageous results, while the presence of the flux promotes the desired dissolving of the oxide on the metal in the glass at such low temperature to permit the formation of a satisfactory seal. After the seal is formed between the molten glass and the metal, the glass is cooled until it solidifies. Thereafter, the glass may be annealed, if desired, to relieve stresses. The physical techniques of forming the seals are known to those skilled in the art and require no further discussion.

The present invention thus provides a process which is simple, inexpensive, highly effective, and which overcomes the prior difficulties heretofore encountered in forming satisfactory seals between glass and tantalum or zirconium metal. The process of the present invention makes possible the formation of seals which are strong and which do not permit leakage of gases or liquids, without excessive oxidation or embrittlement of the metal.

The process of the present invention finds wide application in various arts; for example, it is extremely useful in the manufacture of electrolytic condensers employing filmed tantalum or zirconium electrodes, which electrodes are connected to tantalum or zirconium lead wires passing through the walls of glass containers for the electrolyte. It is also useful in sealing tantalum or zirconium to glass in the manufacture of electron discharge devices, incandescent light bulbs, etc.

Various modifications may be made in the above-described processes embodying the present invention, and the process of the present invention may be employed for various uses other than those indicated.

It is intended that the patent shall cover by suitable expression in the appended claims whatever features of patentable novelty reside in the invention.

What is claimed is:

1. The process of forming a seal between glass and a body of a metal chosen from the group consisting of tantalum and zirconium comprising applying molten glass to a surface of said metal body while said surface is in contact with a flux comprising essentially at least one fluoride of a metal chosen from the group consisting of the alkali metals and the alkaline earth metals.

2. The process of forming a seal between glass and a body of a metal chosen from the group consisting of tantalum and zirconium comprising depositing on a surface of said metal body a flux comprising essentially at least one fluoride of a metal chosen from the group consisting of alkali metals and alkaline earth metals, and thereafter applying a molten glass to said surface.

3. The process of forming a seal between glass and a body of tantalum metal comprising applying molten glass to a surface of said metal body while said surface is in contact with a flux comprising essentially at least one fluoride of a metal chosen from the group consisting of the alkali metals and the alkaline earth metals.

4. The process of forming a seal between glass and a body of zirconium metal comprising applying molten glass to a surface of said metal body while said surface is in contact with a flux comprising essentially at least one fluoride of a metal chosen from the group consisting of the alkali metals and the alkaline earth metals.

5. The process of forming a seal between glass and a body of a metal chosen from the group consisting of tantalum and zirconium comprising depositing on a surface of said metal body a solution in which the solute comprises essentially at least one fluoride of a metal chosen from the group consisting of the alkali metals and the alkaline earth metals, and thereafter applying a molten glass to said surface.

6. The process of forming a seal between glass and a body of tantalum metal comprising depositing on a surface of said metal body a solution in which the solute comprises essentially at least one fluoride of a metal chosen from the group consisting of the alkali metals and the alkaline earth metals, and thereafter applying a molten glass to said surface.

7. The process of forming a seal between glass and a body of zirconium metal comprising depositing on a surface of said metal body a solution in which the solute comprises essentially at least one fluoride of a metal chosen from the group consisting of the alkali metals and the alkaline earth metals, and thereafter applying a molten glass to said surface.

8. The process of forming a seal between glass and a body of a metal chosen from the group consisting of tantalum and zirconium comprising depositing on a surface of said metal body a dry flux comprising essentially at least one fluoride of a metal chosen from the group consisting of the alkali metals and the alkaline earth metals, and thereafter applying a molten glass to said surface.

9. The process of forming a seal between glass and a body of tantalum metal comprising depositing on a surface of said metal body a dry flux comprising essentially at least one fluoride of a metal chosen from the group consisting of the alkali metals and the alkaline earth metals, and thereafter applying a molten glass to said surface.

10. The process of forming a seal between glass and a body of zirconium metal comprising depositing on a surface of said metal body a dry flux comprising essentially at least one fluoride of a metal chosen from the group consisting of the alkali metals and the alkaline earth metals, and thereafter applying a molten glass to said surface.

11. The process of forming a seal between glass and a body of a metal chosen from the group consisting of tantalum and zirconium comprising applying molten glass to a surface of said body while said surface is in contact with a flux comprising essentially sodium fluoride.

RAYMOND L. TAYLOR.